United States Patent
Putman et al.

(10) Patent No.: US 11,086,988 B1
(45) Date of Patent: *Aug. 10, 2021

(54) METHOD, SYSTEMS AND APPARATUS FOR INTELLIGENTLY EMULATING FACTORY CONTROL SYSTEMS AND SIMULATING RESPONSE DATA

(71) Applicant: Nanotronics Imaging, Inc., Cuyahoga Falls, OH (US)

(72) Inventors: Matthew C. Putman, Brooklyn, NY (US); John B. Putman, Celebration, FL (US); Vadim Pinskiy, Wayne, NJ (US); Andrew Sundstrom, Brooklyn, NY (US); James Williams, III, New York, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,124

(22) Filed: Jun. 12, 2020

Related U.S. Application Data

(60) Provisional application No. 62/983,510, filed on Feb. 28, 2020.

(51) Int. Cl.
*G06F 21/00* (2013.01)
*G06F 21/55* (2013.01)
(Continued)

(52) U.S. Cl.
CPC ........ *G06F 21/552* (2013.01); *G06F 9/45508* (2013.01); *G06F 30/20* (2020.01); *G06N 20/00* (2019.01); *G06F 2221/034* (2013.01)

(58) Field of Classification Search
CPC .... G06F 21/552; G06F 9/45508; G06F 30/20; G06F 2221/034; G06N 20/00
See application file for complete search history.

(56) References Cited

U.S. PATENT DOCUMENTS

| | | |
|---|---|---|
| 6,266,436 B1 | 7/2001 | Bett et al. |
| 8,185,217 B2 | 5/2012 | Thiele |
| (Continued) | | |

FOREIGN PATENT DOCUMENTS

| | | |
|---|---|---|
| AU | 2002359881 B2 | 7/2003 |
| CN | 102466566 B | 5/2012 |
| (Continued) | | |

OTHER PUBLICATIONS

Papanastasiou et al., "Bridging the Gap between Physical Layer Emulation and Network Simulation", 2010 IEEE Wireless Communication and Networking Conference, Date of Conference: Apr. 18-21 (Year: 2010).*

(Continued)

*Primary Examiner* — Morshed Mehedi
(74) *Attorney, Agent, or Firm* — DLA Piper LLP (US)

(57) ABSTRACT

A controller emulator, coupled to an interface that exposes the controller emulator to inputs from external sources, provides one or more control signals to a process simulator and a deep learning process. In response, the process simulator simulates response data that is provided to the deep learning processor. The deep learning processor generates expected response data and expected behavioral pattern data for the one or more control signals, as well as actual behavioral pattern data for the simulated response data. A comparison of at least one of the simulated response data to the expected response data and the actual behavioral pattern data to the expected behavioral pattern data is performed to determine whether anomalous activity is detected. As a result of detecting anomalous activity, one or more operations are performed to address the anomalous activity.

20 Claims, 7 Drawing Sheets

(51) Int. Cl.
    *G06N 20/00*     (2019.01)
    *G06F 30/20*     (2020.01)
    *G06F 9/455*     (2018.01)

(56) References Cited

U.S. PATENT DOCUMENTS

| | | | |
|---|---|---|---|
| 8,612,043 | B2 | 12/2013 | Moyne et al. |
| 8,909,926 | B2 | 12/2014 | Brandt et al. |
| 9,945,264 | B2 | 4/2018 | Wichmann et al. |
| 2006/0058898 | A1* | 3/2006 | Emigholz ............ C10G 11/187 700/29 |
| 2012/0151585 | A1 | 6/2012 | Lamastra et al. |
| 2013/0031037 | A1 | 1/2013 | Brandt et al. |
| 2015/0067844 | A1 | 3/2015 | Brandt et al. |
| 2015/0096022 | A1 | 4/2015 | Vincent et al. |
| 2017/0093897 | A1* | 3/2017 | Cochin ................ G06F 21/566 |
| 2017/0102694 | A1 | 4/2017 | Enver et al. |
| 2017/0255723 | A1 | 9/2017 | Asenjo et al. |
| 2018/0114121 | A1* | 4/2018 | Rana ................. G06Q 10/0639 |
| 2018/0165602 | A1 | 6/2018 | Van Seijen et al. |
| 2018/0292811 | A1 | 10/2018 | Baseman et al. |
| 2018/0358271 | A1 | 12/2018 | David |
| 2019/0094842 | A1 | 3/2019 | Lee et al. |
| 2019/0094843 | A1 | 3/2019 | Lee et al. |
| 2019/0138897 | A1* | 5/2019 | Xu ........................ G06N 3/084 |
| 2019/0197236 | A1* | 6/2019 | Niculescu-Mizil .... G06N 3/084 |
| 2019/0213099 | A1* | 7/2019 | Schmidt ................ G06F 9/5083 |
| 2019/0294869 | A1* | 9/2019 | Naphade ................ G06K 9/209 |
| 2019/0295906 | A1 | 9/2019 | Clark et al. |
| 2020/0111689 | A1 | 4/2020 | Banna et al. |
| 2020/0314128 | A1* | 10/2020 | Hild ....................... G06N 20/00 |

FOREIGN PATENT DOCUMENTS

| | | |
|---|---|---|
| CN | 106921676 B | 7/2017 |
| EP | 2 585 248 B1 | 10/2017 |
| WO | 2005093535 A3 | 11/2005 |
| WO | 2018/044410 | 3/2018 |

OTHER PUBLICATIONS

LSTM-based Encoder-Decoder for Multi-sensor Anomaly Detection; Pankaj Malhotra et al.; arXiv:1607.00148v2 [cs.AI] Jul. 11, 2016.

Variational Autoencoder based Anomaly Detection using Reconstruction Probability; Jinwon An et al.; SNU Data Mining Center 2015-2 Special Lecture on IE; Dec. 27, 2015.

Intelligent tuning method of PID parameters based on iterative learning control for atomic force microscopy; Hui Liu et al.; Contents lists available at ScienceDirect Micron; journal homepage: www.elsevier.com/locate/micron.

Anomaly Detection Using Autoencoders with Nonlinear Dimensionality Reduction; Mayu Sakurada et al.

Intrusion Alert: Systems uses machine learning, curiosity-driven "honey-pots" to stop cyber attackers; Purdue University; Research Foundation News; Feb. 6, 2020.

Stuxnet Worm Impact on Industrial Cyber-Physical System Security; Stamatis Karnouskos; SAP Research, Germany.

Anomaly Detection with Robust Deep Autoencoders; Chong Zhou et al.; KDD 2017 Research Paper; KDD'17, Aug. 13-17, 2017, Halifax, NS, Canada.

PCT International Application No. PCT/US21/19857, International Search Report and Written Opinion of the International Searching Authority, dated May 7, 2021, 16 pages.

* cited by examiner

METHOD, SYSTEMS AND APPARATUS FOR INTELLIGENTLY EMULATING FACTORY CONTROL SYSTEMS AND SIMULATING RESPONSE DATA

CROSS REFERENCE

This application claims the benefit of U.S. Provisional Application No. 62/983,510, filed Feb. 28, 2020, entitled "Method, Systems and Apparatus for Intelligently Emulating Factory Control Systems and Simulating Response Data," which is hereby incorporated by reference herein in its entirety. This application is related to U.S. patent application Ser. No. 16/663,245 entitled "Predictive Process Control for a Manufacturing Process," which is hereby incorporated by reference herein in its entirety. Further, this application is related to U.S. patent application Ser. No. 16/781,193 entitled "Dynamic Monitoring and Securing of Factory Processes, Equipment and Automated Systems," which is hereby incorporated by reference herein in its entirety. In addition, this application is related to U.S. Patent Application No. 62/983,487 entitled "Dynamic Monitoring and Securing of Factory Processes, Equipment and Automated Systems," which is hereby incorporated by reference herein in its entirety.

FIELD OF THE INVENTION

The present disclosure generally relates to systems, apparatuses and methods for intelligently emulating factory control systems and simulating response data to successfully attract malware attacks that target factories and to analyze their behavior.

BACKGROUND

Malware attacks against factories are proliferating and becoming very sophisticated. Further, these malware attacks are often capable of penetrating isolated and closed computer networks, as well as machines connected to external networks (e.g., 4G and 5G networks). Many of these attacks often target factory control systems that control the operation of a factory's physical equipment and processes. Malware, as used herein, refers to any hardware or software that causes damage, disruption, or unauthorized access or manipulation, for example, to a computer, server, controller, computer network, computer-controlled equipment, data, or the quality or yield of a final output. Malware can include computer viruses, worms, Trojan horses, spyware, backdoors, or generally any program or file that can be harmful to a computer system. Malware can be designed to target a factory's control systems and cause subtle changes to the operation of the factory's physical equipment and processes that are often able to evade conventional information technology (IT) security solutions or conventional process control systems.

To help identify threats to a factory's control systems, a security mechanism known as a honeypot may be set up to imitate a factory's control systems, equipment and processors in order to attract the same malware that is likely to target a factory's production control systems. Designers of malware attacks, aware that honeypots exist to ferret out such attacks, have, in response, increased the sophistication of their malware by designing the malware to detect honeypots, e.g., by searching for specific identifiers associated with the control systems of the targeted factories and by testing expected responses of these systems. If the identifiers or responses do not seem authentic, then the malware may be alerted that it detected a honeypot and may conceal its presence, defeating the purpose of the honeypots.

Further, malware may be introduced across a factory's control systems at many different sites, including, but not limited to, the following: computers, computer networks, process controllers, programmable logic controllers (PLC), distributed control systems (DCS), supervisory control and data acquisition systems (SCADA), and other digital apparatuses deployed at a factory. Accordingly, designing a realistic honeypot that is able to mimic the entirety of a factory's control systems and fool a sophisticated malware attack is very difficult.

Accordingly, it is desirable to provide a new mechanism for intelligently emulating a factory's production control systems, as well as simulating response data similar to the response data generated by a factory's process, equipment, and control systems during production in order to successfully attract malware attacks that target such systems and to analyze their behavior.

In one example, a computer-implemented method includes providing, by a controller emulator coupled to an interface, one or more control signals to a process simulator and a deep learning processor, wherein the interface exposes the controller emulator to inputs from an external source; in response to receiving the one or more control signals, simulating, by the process simulator, response data that is provided to the deep learning processor; generating, by the deep learning processor, expected response data and expected behavioral pattern data for the one or more control signals; generating, by the deep learning processor, actual behavioral pattern data for the simulated response data; comparing at least one of: (i) the simulated response data to the expected response data, and (ii) the actual behavioral pattern data to the expected behavioral pattern data to determine whether anomalous activity is detected; and as a result of detecting the anomalous activity, performing one or more operations to address the anomalous activity.

In some examples, the deep learning processor includes a conditioned machine learning model.

In some examples, the simulated response data includes a control value that is provided to the controller emulator.

In some examples, the one or more operations include shutting down one or more factory process, equipment, and control (P/E/C) systems at risk as a result of the anomalous activity.

In some examples, the one or more operations include generating a notification, wherein the notification specifies the anomalous activity, and wherein the notification is provided to an operator to review the anomalous activity.

In some examples, the anomalous activity is detected as a result of a comparison of the simulated response data to the expected response data indicating a deviation.

In some examples, the anomalous activity is detected as a result of a comparison of the actual behavioral pattern data to the expected behavioral pattern data indicating a deviation.

In some examples, the one or more operations include determining whether the anomalous activity is a malware attack received by the controller emulator from the interface, wherein a determination that the anomalous activity is the malware attack is generated as a result of a confidence level score of the anomalous activity satisfying a confidence level threshold corresponding to detection of the malware attack.

In one example, a system includes one or more processors and memory storing thereon instructions that, as a result of being executed by the one or more processors, cause the system to: receive, from a controller emulator coupled to an interface, one or more control signals, wherein the interface exposes the controller emulator to inputs from an external source; in response to receiving the one or more control signals, simulate response data including control values; generate expected response data and expected behavioral pattern data for the one or more control signals; generate behavioral pattern data, wherein the behavioral pattern data is generated using the simulated response data; compare at least one of: (i) the simulated response data to the expected response data and (ii) the actual behavioral pattern data to the expected behavioral pattern data to determine whether anomalous activity is detected; and as a result of detecting the anomalous activity, perform one or more operations to address the anomalous activity.

In some examples, the one or more processors include a conditioned machine learning model.

In some examples, the one or more operations include communicating an alert protocol to cause the controller emulator to shut down one or more factory process, equipment, and control (P/E/C) systems at risk as a result of the anomalous activity.

In some examples, the instructions that cause the one or more processors to perform the one or more operations to address the anomalous activity further cause the system to: determine, based on the anomalous activity detected, a confidence level associated with the anomalous activity; and identify, based on the confidence level, the one or more operations.

In one example, a non-transitory, computer-readable storage medium storing thereon executable instructions that, as a result of being executed by a computer system, cause the computer system to: receive, from a controller emulator coupled to an interface one or more control signals, wherein the interface exposes the controller emulator to inputs from an external source; in response to receiving the one or more control signals, simulate response data including control values; generate expected response data and expected behavioral pattern data for the one or more control signals; generate behavioral pattern data, wherein the behavioral pattern data is generated using the simulated response data; compare at least one of: (i) the simulated response data to the expected response data and (ii) the actual behavioral pattern data to the expected behavioral pattern data to determine whether anomalous activity is detected; and as a result of detecting the anomalous activity, perform one or more operations to address the anomalous activity.

In some examples, the one or more operations include: determining whether the anomalous activity is a malware attack received by the controller emulator from the interface; and as a result of a determination that the anomalous activity is the malware attack, communicating an alert protocol to cause the controller emulator to shut down one or more factory process, equipment, and control (P/E/C) systems at risk as a result of the malware attack.

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these figures depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
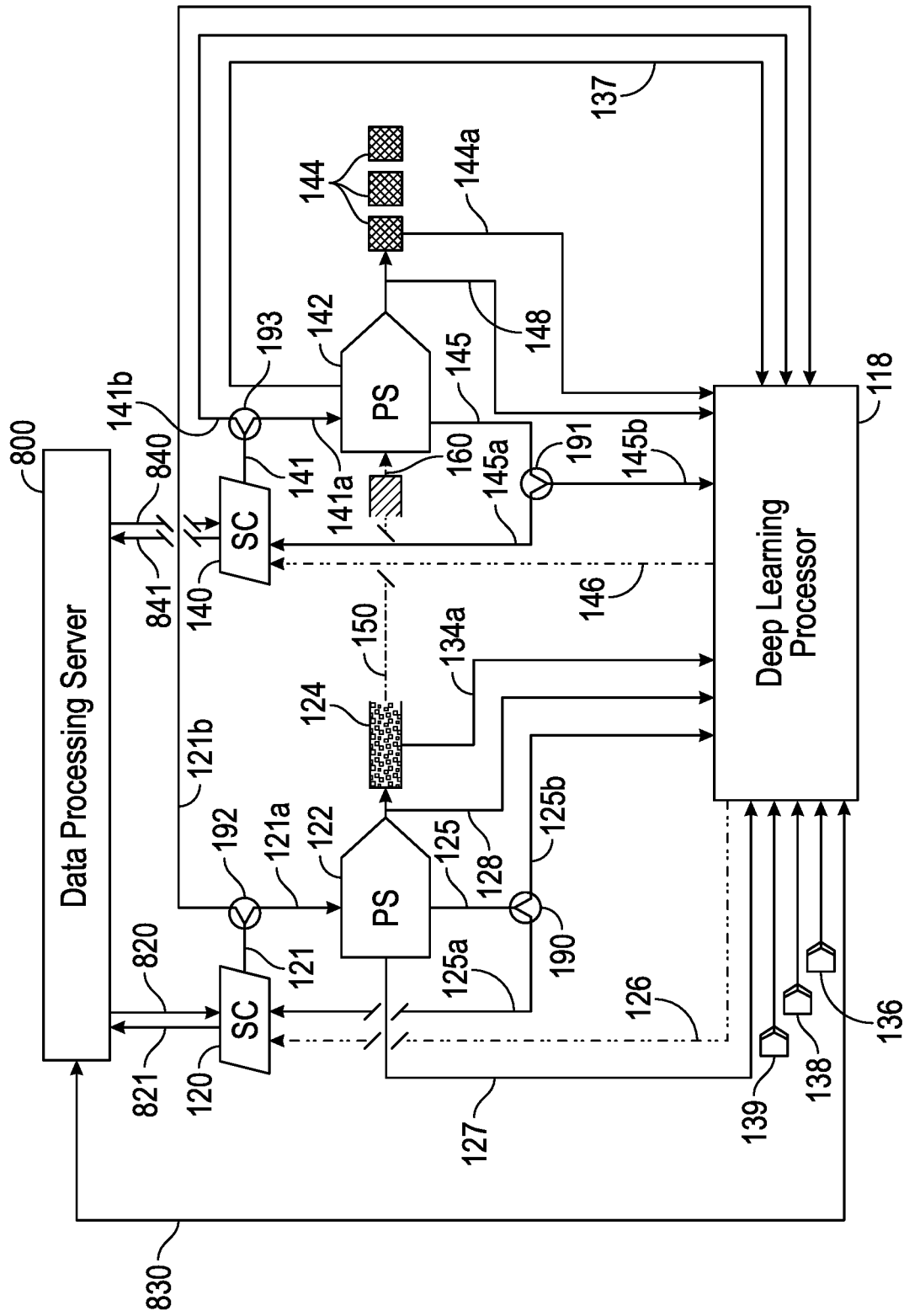
FIG. 1 illustrates an example method of providing inputs to a deep learning processor during operation and control of a factory process.

In accordance with some embodiments of the disclosed subject matter, mechanisms (which can include systems, methods, devices, apparatuses, etc.) are disclosed for intelligently emulating factory control systems and simulating response data that is similar to response data generated by a factory's production process, equipment, and control systems, to successfully attract malware attacks that target factories and to analyze their behavior.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

A factory's manufacturing process is complex and comprises raw materials being processed by different process stations (or "stations") until a final product (referred to herein as "final output") is produced. With the exception of the final process station, each process station receives an input for processing and outputs an intermediate output that is passed along to a subsequent process station for additional processing. The final process station receives an input for processing and outputs the final output.

Factories rely on many process stations that include physical equipment that are automatically controlled. These automatically controlled process stations are vulnerable to attacks from malware, which if not detected early can cause interference or non-repairable damage to equipment and product yield. While the intelligent honeypot mechanism of the subject disclosure refers to emulating control systems and simulating equipment and process in a factory environment, the intelligent honeypot mechanism can also be applied to any industrial or critical infrastructure facility that deploy industrial control systems, such as power plants, power grids, utilities, telecommunication, financial, health, transportation facilities. The intelligent honeypot mechanism can also be applied to control systems of discrete Internet of Things (IoT) devices. Additional details of a factory environment including a factory's process, equipment, control systems are described in U.S. patent application Ser. No. 16/781,193 entitled "Dynamic Monitoring and Securing of Factory Processes, Equipment and Automated Systems," which is hereby incorporated by reference herein in its entirety.

Operation of each process station can be governed by one or more process controllers. In some implementation, each process station has one or more process controllers (referred to herein as "a station controller" or a "process controller") that are programmed to control the operation of the process station (the programming algorithms referred to herein as "control algorithms"). However, in some aspects, a single process controller may be configured to control the operations of two or more process stations. One example of a process controller is a Programmable Logic Controller (PLC). A PLC can be programmed to operate a factory's processes and systems. The PLC or other process controller can receive information from connected sensors or input devices, process the data and generate outputs (e.g., control signals to control an associated process station) based on pre-programmed parameters and instructions. Other examples of process controllers include distributed control systems (DCS) and supervisory control and data acquisition systems (SCADA).

An operator or control algorithms can provide the process controller with process controller setpoints (or "setpoints" or "controller setpoints" or CSPs) that represent a desired single value or range of values for each control value. The values that can be measured during the operation of a station's equipment or processes can either be classified as control values or station values. A value that is controlled by a process controller will be classified herein as control values, the other measured values will be classified herein as station values. Examples of control and/or station values include, but are not limited to: speed, temperature, pressure, vacuum, rotation.

The control algorithms can also include instructions for monitoring control values, comparing control values to corresponding setpoints and determining what actions to take when the control value is not equal to (or not within a defined range of) a corresponding process controller setpoint. For example, if the measured present value of the temperature for the station is below the setpoint, then a signal may be sent by the process controller to increase the temperature of the heat source for the station until the present value temperature for the station equals the setpoint. Conventional process controllers used in the manufacturing process to control a station are limited, because they follow static algorithms (e.g., on/off control, PI control, PID control, Lead/Lag control) for prescribing what actions to take when a control value deviates from a setpoint.

One or more sensors can be included within or coupled to each process station. These can be physical or virtual sensors, analog or digital, that exist in a factory process unrelated to the operation of deep learning processor 118 (as shown in FIG. 1), as well as any new sensors that can be added to perform any additional measurements required by deep learning processor 118. Sensors can be used to measure values generated by a factory process such as: station values, control values, intermediate and final output values. Example sensors can include, but are not limited to: rotary encoders for detecting position and speed; sensors for detecting proximity, pressure, temperature, level, flow, current and voltage; limit switches for detecting states such as presence or end-of-travel limits. Sensor, as used herein, includes both a sensing device and signal conditioning. For example, the sensing device reacts to the station or control values and the signal conditioner translates that reaction to a signal that can be used and interpreted by deep learning processor or the station controller. Example of sensors that react to temperature are RTDs, thermocouples and platinum resistance probes. Strain gauge sensors react to pressure, vacuum, weight, change in distance among others. Proximity sensors react to objects when they are within a certain distance of each other or a specified tart. With all of these examples, the reaction must be converted to a signal that can be used by a station controller or deep learning processor. In many cases the signal conditioning function of the sensors produce a digital signal that is interpreted by the station controller. The signal conditioner can also produce an analog signal or TTL signal among others. Virtual sensors also known as soft sensors, smart sensors or estimators include system models that can receive and process data from physical sensors.

A process value, as used herein refers to a station value or control value that is aggregated or averaged across an entire series of stations (or a subset of the stations) that are part of the factory process. Process values can include, for example, total throughput time, total resources used, average temperature, average speed.

In addition to station and process values, various characteristics of a process station's product output (i.e., intermediate output or final output) can be measured, for example: temperature, weight, product dimensions, mechanical, chemical, optical and/or electrical properties, number of design defects, the presence or absence of a defect type. The various characteristics that can be measured, will be referred to generally as "intermediate output value" or "final output value." The intermediate/final output value can reflect a single measured characteristic of an intermediate/final output or an overall score based on a specified set of characteristics associated with the intermediate/final output that are measured and weighted according to a predefined formula.

Malware can be designed to disrupt the proper functioning of a factory's process, equipment and control ("P/E/C") systems in a number of ways. For instance, malware executing on a computing device may cause a process controller to send control signals to its associated process station(s) to operate at levels that will be harmful to the equipment itself or its output. Additionally, this malware may cause fluctuating control values at a harmful rate or at harmful increments. Further, computing devices executing malware or other malicious applications may provide false feedback to the process controller, so that the controller is not aware of harmful conditions at an associated process station and, thus, may not make needed adjustments. Malware can also be designed to target one or more sensors to manipulate or corrupt the measured values generated by a factory's P/E/C systems. Malware can also be designed to intercept or monitor data generated by a factory's P/E/C systems or data communicated among components in a factory's P/E/C systems such as station processors, controllers, data processing servers, sensors. Because a factory's equipment and processes are controlled by control systems (e.g., PLCs, DCSs, SCADA), malware typically targets the control systems at a factory to impact the factory's processes and equipment.

To avoid detection by any factory decoys (e.g., honeypots) setup to lure malware, malware will search for specific identifiers associated with the control systems of the targeted factories and test expected responses of these systems. Only when the malware is satisfied that it has identified authentic factory production controllers, will the malware release its attack.

Accordingly, it is desirable to provide a new mechanism (referred to herein as an "intelligent honeypot") for intelligently emulating a factory's production control systems and simulating response data similar to the response data generated by a factory's process, equipment, and control systems during production to successfully attract malware attacks that target such systems and to analyze their behavior. As used herein, an emulator refers to hardware or software that mimics the exact behavior of another system and strictly abides by parameters and rules of the emulated systems; and a simulator refers to a computer program that is able to imitate the operation of another system in certain aspects, loosely abiding by the other systems rules and parameters. The intelligent honeypot can include a conditioned deep learning processor 118 that has been trained on extensive data from a factory's P/E/C systems. In further embodiments, the deep learning processor can also be trained on data from other factory's P/E/C systems and synthetic data. The intelligent honeypot can be coupled to an interface to receive external inputs and expose the intelligent honeypot to malware attacks. The intelligent honeypot can be any device capable of executing commands, storing data, inputting and outputting all signals associated with the actual process and includes computers, single board computers, microprocessors, microcomputers and microcomputer chip design, among others.

A deep learning processor based on machine-learning (ML) or artificial intelligence (AI) models may be used to evaluate control values, station values, process values, data output, and/or intermediate and final output values (collectively, "response data") along with associated station controller setpoints, functional priors, experiential priors, and/or universal inputs to train machine learning models to identify any variation from typical factory control and operation. As understood by those of skill in the art, machine learning based techniques can vary depending on the desired implementation, without departing from the disclosed technology. For example, machine learning techniques can utilize one or more of the following, alone or in combination: hidden Markov models; recurrent neural networks; convolutional neural networks (CNNs); deep-learning; Bayesian symbolic methods; reinforcement learning, general adversarial networks (GANs); support vector machines; image registration methods; long-term, short term memory (LSTM); and the like.

Machine learning models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. The machine learning models can be based on supervised and/or unsupervised methods.

FIG. 1 illustrates an example deep learning processor 118 that can be configured to dynamically monitor the operation and control of any number of (referred to herein by "N") processing stations in a manufacturing process. In FIG. 1, the N processing stations of a manufacturing process are represented by process stations 122 and 142. The process stations can operate serially or in parallel.

Setpoints, algorithms, initial input and operating instructions, system and process updates and other control inputs to station controllers 120 and 140 (steps 820 and 840 respectively), can be provided by a local or central data processing server 800. In some embodiments data processing server 800 can be one or more computers on a network. In some embodiments, steps 820 and 840 can be performed manually by an operator. Data processing server 800, in some embodiments, can also receive data output generated by station controllers 120 and 140, as well as data generated by sensors coupled to or within process stations 122 or 142, or from independent sensors 127 and 137. Data output, includes, but is not limited to: (i) data generated during the manufacturing process (e.g., data logs coupled to physical sensors, process station components, or station controller components); (ii) data received by or transmitted from each process station or station controller and (iii) data communications and data generation patterns of individual or any number of process stations or station controllers (e.g., high data volumes, low data volumes, erratic data volumes, unusual data communication or data generation based on time of day, origin or destination of the data). In further embodiments, data processing server 800 can receive all response data, as defined in connection with FIG. 2. In some embodiments, the data output can be provided to deep learning processor 118 (step 830). In other embodiments, in order to isolate deep learning processor 118, data processing server will not provide any inputs to deep learning processor 118. In some embodiments, data processing server 800 can also receive data from related manufacturing processes occurring in remote geographic locations and provide such data to deep learning processor 118. In further embodiments, data that a factory collects to perform analysis, as well as analysis data, such as in a control room, can be collected by data processing server 800. Not all data inputs to data processing server 800 are shown in FIG. 1.

Universal inputs 136, experiential priors 139, functional priors 138, and values from each of the N stations (e.g., 122 and 142) can be provided to deep learning processor 118. In other embodiments, any number of additional deep learning processors can be used and configured to train deep learning processor 118 and the process simulator. In some embodiments, universal inputs 136, experiential priors 139, functional priors 138 can include spatial scans of the process controllers and other components of the factory's P/E/C system. The spatial scans can provide a source of product identification numbers and other information found on the circuit board and can be combined or cross referenced with the information from board logs (bios).

Functional priors, as used herein, refers to information relating to the functionality and known limitations of each process station, individually and collectively, in a manufacturing process. The specifications for the equipment used at the process station, as well as all product models and identifying information, are all considered functional priors. Example functional priors can include, but are not limited to: a screw driven extruder that has a minimum and maximum speed that the screw can rotate; a temperature control system that has a maximum and minimum temperature achievable based on its heating and cooling capabilities; a pressure vessel that has a maximum pressure that it will contain before it explodes; a combustible liquid that has a maximum temperature that can be reached before combustion. Functional priors can also include an order in which the individual stations that are part of a manufacturing process perform their functions. Further, functional priors can include normal process variations and normal process noise. Normal process variations can include machine tolerances (e.g., temperature control variations +/−1 deg C., conveyor speed variations +/−0.1 m/min, pressure variations +/−3 kPa); raw material variations, variations in cooling water temperature, variations due to operator error and normal process noise can include, for example, jitter in electrical signals and rounding errors in data collection and recording.

Experiential priors as used herein, refers to information gained by prior experience with, for example performing the same or similar manufacturing process; operating the same or similar stations; producing the same or similar intermediate/final outputs; root cause analysis for defects or failures in final outputs for the manufacturing process and solutions. Experiential priors can also include log data from all of a factory's P/E/C systems, as well as data collected by data processing server 800.

Universal inputs, as used herein, refers to a value that is not specific to a particular process station, but rather to an aspect of the entire manufacturing process, for example, a date, time of day, ambient temperature, humidity or other environmental conditions that might impact the manufacturing process, operator, level of skill of the operator and likelihood of error, raw materials used in the process, raw material specifications such as color, viscosity, particle size, among other characteristics that are specific to the raw material, specific lot numbers and cost of raw materials, tenure of the equipment/tools for each station, identifying information such as production work order numbers, batch numbers, lot numbers, finished product numbers and finished product serial numbers.

Note, that the examples provided for each of functional priors, experiential priors and universal inputs represent one way to classify these examples, other suitable classifications can be used. For example, another way to classify the input that is provided to deep learning processor 118 is: pre-process inputs (e.g., experiential priors, functional priors, material properties, scheduling requirements); in-process inputs (e.g., universal inputs, control values, station values, intermediate values, final output values, process values); post-process inputs (e.g., manufacturing performance metrics and other analytics). Further, the functional and experiential priors can be dynamically updated throughout the manufacturing process.

Each process station can be controlled by one or more associated station controllers (e.g., station controller 120 controls process station 122 and station controller 140 controls process station 142). In an embodiment, a single station controller can control multiple process stations or control multiple control values associated with a single process station. In some embodiments, deep learning processor 118 can provide control inputs (represented by 126 and 146) based on predictive process control or pre-programmed algorithms to each process station controller. Predictive process control is described in U.S. patent application Ser. No. 16/663,245 entitled "Predictive Process Control for a Manufacturing Process," which is hereby incorporated by reference herein in its entirety. In other embodiments, the deep learning processor does not provide any inputs to the station controller.

A signal conditioner 190, 191, 192 and 193, for example a signal splitter, amplifier, digital to analog converter, analog to digital converter, TTL, can be included to divide the control signals (e.g., 121 is divided into 121a and 121b and 141 is divided into 141a and 141b) and the control values (e.g., 125 is divided into 125a and 125b and 145 is divided into 145a and 145b) so that the control signals and the control values are sent both to deep learning processor 118 and the relevant station controller (e.g., 120 or 140). The control values can be analog or digital signals. Further, a signal conditioner, according to some embodiments, can be included within deep learning processor and can convert all analog values to digital values or perform other conditioning. Each station controller can provide one or more control signals (e.g., 121 and 141) that provides commands for regulating a station's control values (e.g., control values 125 and 145). Each station outputs an intermediate output (e.g., 124 and 144), that has an intermediate output value (134a and 144a respectively). All intermediate output values and the final output value (e.g., 144, if process station 142 is the final process station in the process) from the processing stations are provided to deep learning processor 118. Each station also outputs station values (e.g., 128 and 148) that can be provided to deep learning processor 118. FIG. 1 also illustrates that intermediate output 124 is sent (step 150) to one or more subsequent stations, which can represent a single station or any number of multiple stations. Station 142, as shown in FIG. 1, can receive (step 160) an intermediate input from any number of prior stations. In some embodiments, the setpoint values used by the station controllers (e.g., controllers 120 and 140) can be sent to deep learning controller 118. Further, values relating to the manufacturing process can be measured by independent sensors (e.g., independent sensor 127 and 137) and provided to deep learning controller 118.

It is understood that the communication among deep learning processor 118, the station controllers, process stations and data processing server 800, can use any suitable communication technologies that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies e.g., local area network (LAN), a wide area network (WAN), the Internet, Bluetooth technologies, Near-field communication technologies, Secure RF technologies, and/or any other suitable communication technologies. In some embodiments, in order to isolate deep learning processor 118 from being infected by any malware, deep learning processor 118 may not receive any input from any process controller, data processing server 800, or from any computer connected to a network. In some embodiments, inputs from process controllers or data processing server 800 can be input into deep learning processor 118 manually or input via a memory device (e.g., a thumb drive) after the memory device has been scrubbed for any malware.

In some embodiments, operator inputs can be communicated to deep learning processor 118, and/or any of the station controllers or process stations using any suitable input device (e.g., keyboard, mouse, joystick, touch, touchscreen, etc.).

Figure 2:
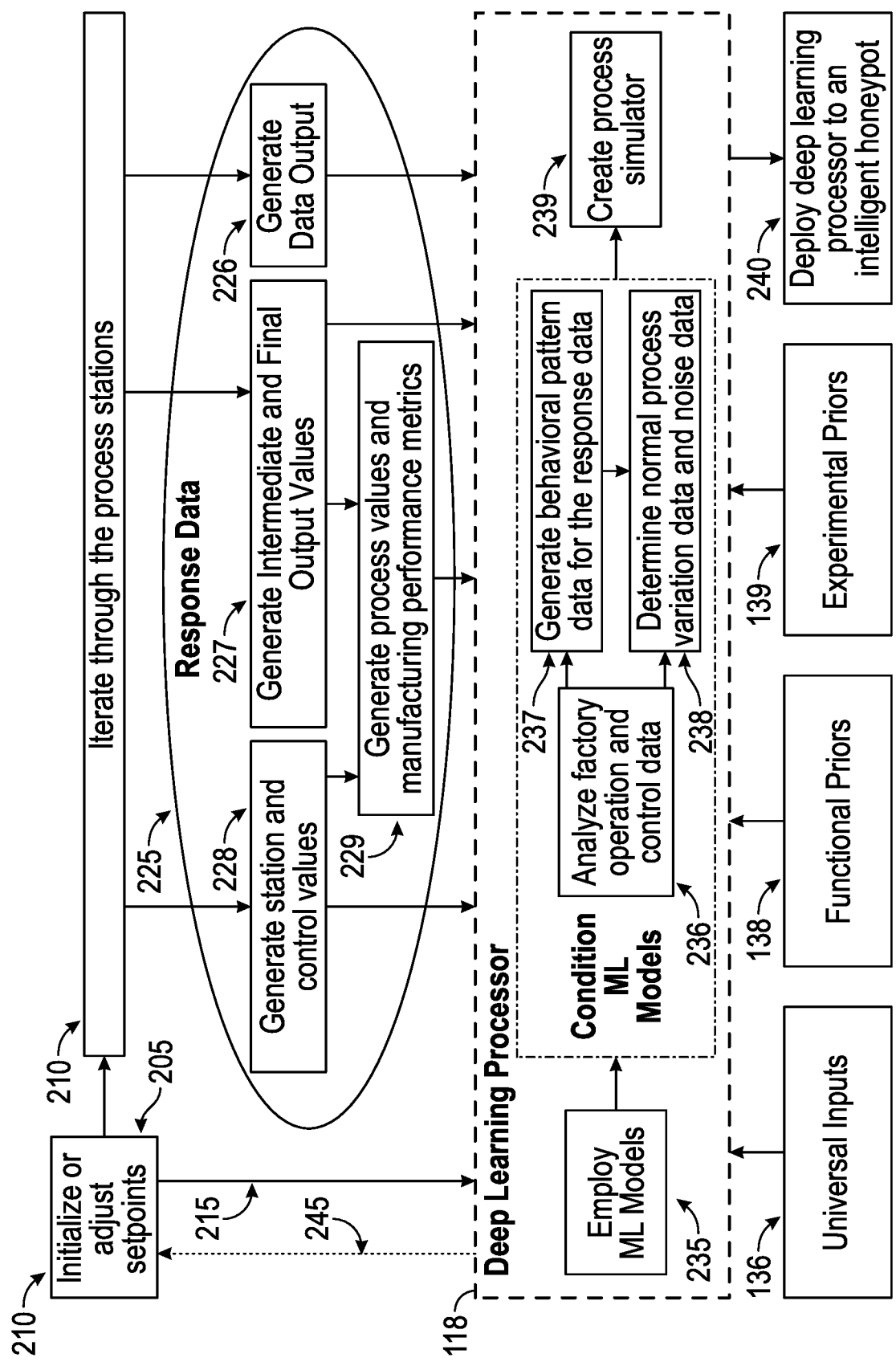
FIG. 2 shows an example method for training a deep learning processor and process simulator.

FIG. 2, according to some embodiments of the disclosed subject matter, provides a method 200 for conditioning (training) machine learning models and creating a process stimulator to be incorporated into an intelligent honeypot. The method 200 may be performed by a control system or other computing system that may provide hardware and/or software configured to implement the deep learning processor 118. FIG. 2 describes the P/E/C systems of a factory. In some embodiments, a similar method can be employed for a particular machine or process in a factory.

In step 205, the setpoints, algorithms and other control inputs for each station controller in a manufacturing process can be initialized using conventional control methods. Further, the control algorithms/operator can provide initial control or station values. The control algorithms, initial setpoint values, and initial control or station values can be provided to deep learning processor 118 (step 215). In other embodiments, the setpoints, algorithms and other control inputs for each station controller in a manufacturing process can be provided to the station controller using predictive process control (step 245), as described in U.S. patent application Ser. No. 16/663,245 "Predictive Process Control for a Manufacturing Process." It should be noted that control values, control algorithms, setpoints and any other information (e.g., process timing, equipment instructions, alarm alerts, emergency stops) provided to a station controller may be referred to collectively as "station controller inputs" or "control inputs." Further, other inputs, like functional priors 138, experiential priors 139 and universal inputs 136 can be provided to deep learning processor 118.

In step 210, the manufacturing process iterates through all the process stations for a predetermined time period, and or based upon another suitable condition (e.g., creation of a robust data set), using conventional or predictive process control methods. The process stations discussed herein can operate in series or in parallel. Further, a single station can perform: a single process step multiple times (sequentially or non-sequentially), or different process steps (sequentially or non-sequentially) for a single iteration of a manufacturing process. The process stations generate intermediate outputs, or a final output if it is a final station. The intermediate output is transmitted to subsequent (downstream) station(s) in the manufacturing process until a final output is generated. In further embodiments, the manufacturing of components for a final output can be asynchronous and geographically disperse. In other words, components for a final output can be manufactured at any time or any place, not necessarily at a time or place proximate to assembling the components into a final output. For example, the headlights of a car can be manufactured months before a car with the headlights is assembled.

As the process iterates through each station, all the values associated with: an individual station (e.g., control values); an output of an individual station (e.g., station values, intermediate/final output values, data output), or multiple stations (e.g., process values) are measured or calculated and provided to deep learning processor 118 (steps 226, 227, 228, 229) to condition its machine learning models. In some embodiments, manufacturing performance metrics (e.g., production volume for a specified time period, production downtime for a specified time period, resources used for a specified time period or a specified number of final outputs, percentage of products not in specification for a specified time period, production volume for a particular operator, material costs associated with a specified number of final outputs) for the manufacturing process under conventional control can be calculated and provided to deep learning processor 118 (step 229).

Although not shown, any actions taken (or control signals generated) by the station controller in response to a received control value or other control input from a process station can be provided to deep learning processor 118. Such actions can include adjusting temperature, speed, etc.

Note all inputs to deep learning processor 118 can be entered electronically or via manual means by an operator. Further, the inputs can be provided directly, or indirectly via a memory device, so that the memory device can be scrubbed for any malware, before the data is provided to the deep learning processor.

The conditioning of deep learning processor 118's machine learning models (steps 236-238) can be achieved through unsupervised learning methods. Other than functional priors 138, experiential priors 139, universal inputs 136 that are input into deep learning processor 118, deep learning processor 118 draws inferences simply by analyzing the received data that it collects during the iteration of the manufacturing process (e.g., steps 226, 227, 228 and 229). In other embodiments, the conditioning of the machine learning models (steps 236-238) can be conditioned via supervised learning methods, or a combination of supervised and unsupervised methods or similar machine learning methods. Further, the conditioning of the machine learning models (can be augmented by: providing deep learning processor 118 with simulated data or data from a similar manufacturing process. In one embodiment, the machine learning models can be conditioned by implementing deep learning processor 118 into a similar manufacturing process and fine-tuning the deep learning processor during implementation in the target manufacturing process. That is, training of deep learning processor 118 can be performed using a training process that is performed before deep learning processor 118 is deployed into a target manufacturing environment.

As shown in FIG. 2, deep learning processor 118 employs machine learning (ML) models (step 235). These machine learning models can be conditioned by analyzing factory operation and control data (step 236), generating behavioral pattern data (step 237) for the response data generated as the manufacturing process iterates through the process stations, and by determining normal process variation data and noise data (step 238).

The factory operation and control data (step 236) can include the following: (i) the particular control value that corresponds to the setpoint; (ii) the other control values (and their corresponding setpoints) generated by the identified process station; (iii) the station values generated by the identified processing station; (iv) the intermediate output values generated by the identified processing station; (v) the control values (and their corresponding setpoints), station values, intermediate and final outputs generated by other process stations; (vi) universal inputs, functional priors, experiential priors; (vii) the control signals and other instructions provided to each processing station; (viii) the control inputs provided to each station controller; (ix) data output; (x) measured values relating to factory control and operation received from independent sensors. Independent sensors can refer to sensors that provide measurements, beyond the sensors included in the normal manufacturing process. Since independent sensors are not part of the normal manufacturing process, they are often protected from malware penetration. In some embodiments, these independent sensors are not directly tied to a single machine or process step and can be fluidly used to measure values from any machine or process step (e.g., a handheld device that randomly takes measurements during the manufacturing process). In some embodiments, independent sensors can provide its outputted values to a coupled monitor, in addition to, or instead of, a deep learning processor 118. Values provided exclusively to a monitor, can be input manually into deep learning processor 118, according to some embodiments.

Generating behavioral patterns (step 237) for the response data, for a single station and across stations, for a single point in time or over a period of time, can include identifying: positive correlations; negative correlations; frequency; amplitude; upward or downward trends; a rate of change for each control value or station value; for an identified response data, other response data that will or will not be affected if the identified response data changes. Response data 225 includes not only the control value associated with a particular set point for an identified process stations, but one or more of the following data types:

(i) control values associated with other set points for the identified process station; (ii) station values associated with the identified process station; (iii) intermediate output values associated with the identified process station; (iv) control values associated with other process stations; (v) station values associated with other process stations; (vi) intermediate output values associated with other process station; (vii) final output value; (viii) data output; (ix) measured values relating to factory control and operation received from independent sensors.

Note, data is usually collected from sensors at a predefined rate. The frequency analysis can take into account this rate and adjust its output value accordingly, so that the output value reflects the true frequency rate, and does not reflect a rate that includes the time it takes to collect data from the sensors. In some embodiments, the frequency analysis can also show rapid changes in a control value after a rise or fall and a brief stabilization period. The stabilization period can be so brief that it is barely detectable. This can be an example of an attack. Instead of a control value stabilizing at a high or at a low point, a malicious signal can be provided to keep increasing or decreasing the control value beyond an acceptable high or low. By increasing or decreasing shortly after stabilization, the attack can seem normal and consistent with the control value's prior increase or decrease.

Based on analyzing: factory operation and control data (step 235), generated behavioral pattern data (step 236) and other inputs to the deep learning processor, deep learning processor 118 can determine normal process variations and normal process noise to further condition its machine learning models. Normal process variations can include machine tolerances (e.g., temperature control variations +/−1 deg C., conveyor speed variations +/−0.1 m/min, pressure variations +/−3 kPa); raw material variations, variations in cooling water temperature, variations due to operator error and normal process noise can include, for example, jitter in electrical signals and rounding errors in data collection and recording.

To create a robust data set for the conditioning of the machine learning models, setpoints (or other control inputs) corresponding to each control value of each process station can be adjusted, in a systematic manner (e.g., from a minimum value to a maximum value), for every value (or a subset of values) that will yield in-specification final outputs. In further embodiments, setpoints (or other control inputs), corresponding to each control value of each process station can be adjusted, in a systematic manner (e.g., from a minimum value to a maximum value), for every value (or a subset of values) at which a process station is capable of operating (i.e., the entire range of values that a process station is capable of operating at, not just limited to what will yield in-specification final outputs). Further, any number and any combination of setpoints can be adjusted for training purposes (step 205). The setpoints (or other control inputs) can be adjusted manually, by pre-programmed algorithms, or by predictive process control.

In some embodiments, one or more setpoints (or other control inputs) can be adjusted to values that will occur during known factory disruptions (e.g., wear and tear of a machine, insertion of a wrong component), unrelated to malware attacks, even if those values yield final outputs that are not in-specification.

In some embodiments, deep learning processor 118 can be implemented along with conventional standard process control systems associated with the operation and control of a factory process. Instead of using all the data associated with the operation and control of a factory process, deep learning processor 118 can train its machine learning algorithms using the same data that is provided to any standard process control system used in the operation and control of a factory process.

For each setpoint adjustment or set of setpoint adjustments (step 205), the manufacturing process can iterate through the process stations (step 210) for a predetermined time period, for a predetermined set of setpoint adjustments, and/or when a defined event occurs (e.g., a predefined amount of response data is collected), and provide setpoints (step 215) and generated response data 225 (e.g., station and control values (step 228), intermediate and final output values (step 227), data output (step 226), process values and manufacturing performance metrics (step 229) to deep learning processor 118. Deep learning processor 118 uses the different inputs received as the manufacturing process iterates through the process stations to condition its machine learning models (steps 236-238).

Figure 3:
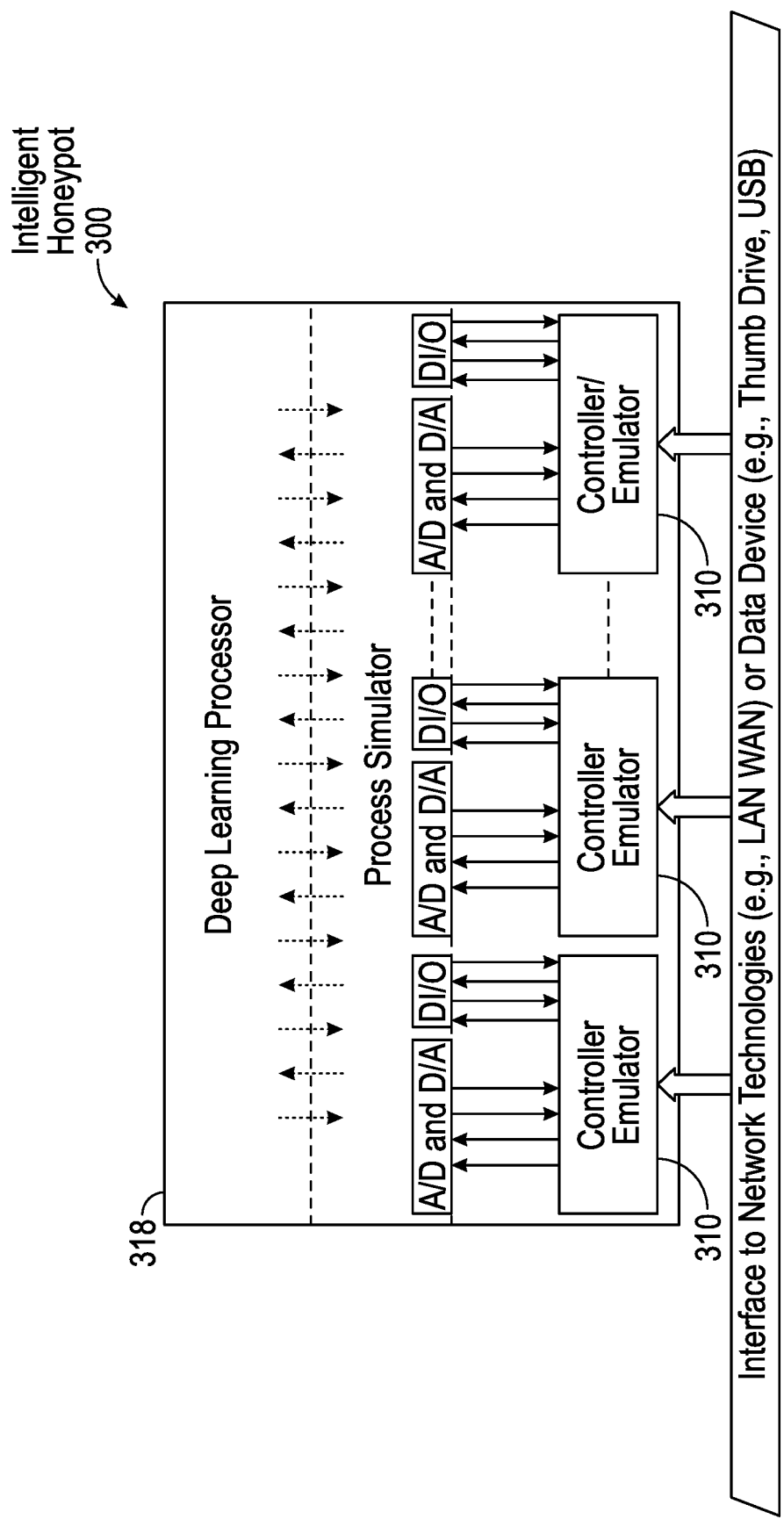
FIG. 3 shows an example intelligent honeypot, in accordance with some embodiments.

After, method 200 has finished iterating through the process stations (e.g., after a predetermined time period, after a predetermined set of setpoint adjustments, and/or when a defined event occurs (e.g., a robust data set is generated)), then the conditioning of the machine learning models (steps 236-238) can be considered complete and a process simulator (step 239) can be created that can simulate response data that accurately reflects response data from a factory's production P/E/C systems. Using machine learning models to create a process simulator that is able to dynamically simulate production response data is more likely to fool sophisticated malware attacks that the intelligent honeypot is a factory production system and not a decoy Deep learning processor 118 with its conditioned machine learning models and process simulator can be deployed to an intelligent honeypot (step 241). An example intelligent honeypot is shown in FIG. 3. According to some embodiments, deep learning processor 118 is disconnected from any production system, can be scrubbed of any malware, and incorporated into an intelligent honeypot. In other embodiments, the intelligent honeypot has its own deep learning processor and only the conditioned machine learning models and created process simulator, scrubbed of any malware, are uploaded to the deep learning processor included in an intelligent honeypot.

Figure 2B:
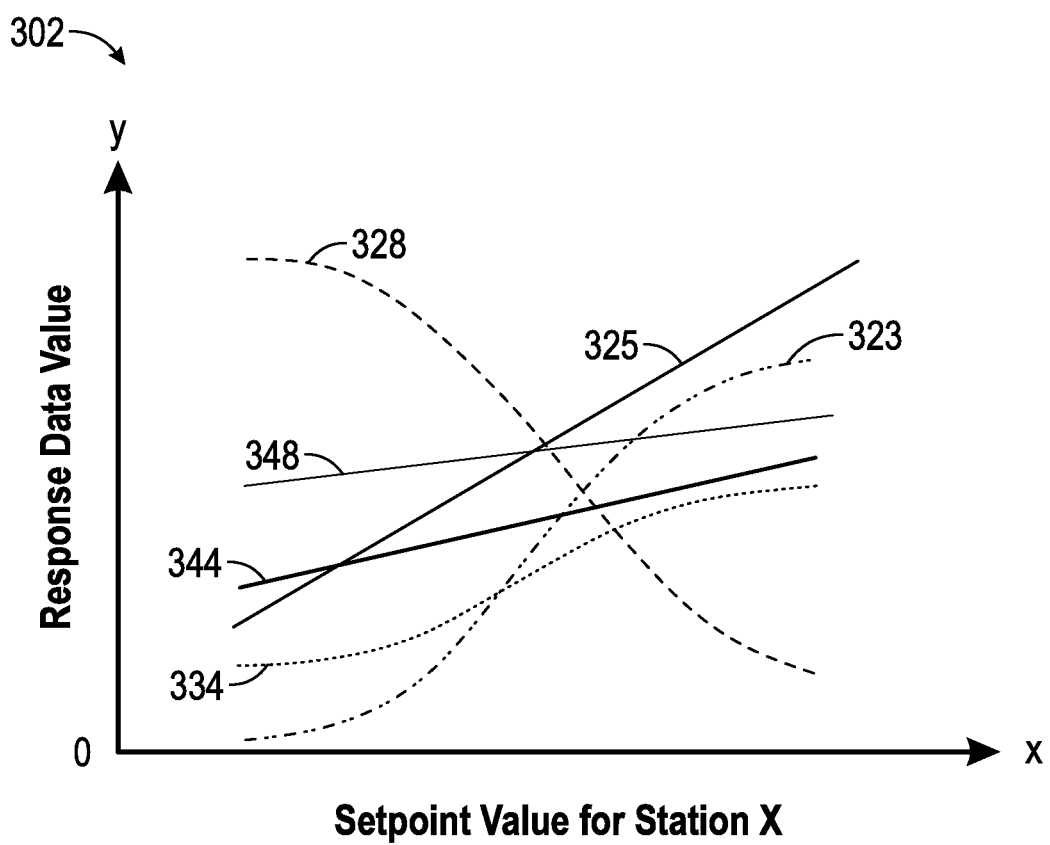
FIG. 2B shows an example behavioral pattern for a subset of response data generated by a factory's P/E/C systems.

FIG. 2B shows an example behavioral pattern for a subset of response data. The response data can empirically derived by actually adjusting setpoints associated with a process station, as described in connection with FIG. 2. The x-axis represents a setpoint value for station X, and the y-axis represents the response data value. The different lines shown in the graph 302 represent the normal behavioral pattern of the response data for values associated with station X, as well as the behavioral pattern of the response data for values associated with another station, station Y. In this example, the setpoint that is increasing along the x-axis represents speed. The response data that is shown in graph 302 include: for station X: control value 325 (i.e., representing speed) that is associated with the increasing setpoint; independent control value 323, which can represent, for example, power; station value 328, which can represent viscosity, and intermediate output value 334, which can represent diameter. The response data for station Y, as shown in graph 302, include station value 348, which can represent temperature, and final output value 344, which can represent weight. FIG. 2 shows the amplitude of each response. It also shows how the response data behaves when setpoint for speed is increased: power (as represented by 323) at the station increases, diameter (as represented by 334) increases, viscosity (as represented by 328) decreases. A change in the setpoint for station X also impacts station Y, for example, temperature at station Y (as represented by 348) increases and weight (as represented by 344) increases. Behavioral patterns can be quite complex, involving thousands of data points, across different stations, and identifying unusual behavioral patterns cannot be performed by human calculation. Therefore, machine learning analysis is needed to generate or learn behavioral patterns for the response data and to analyze those behavioral patterns for anomalous activity.

FIG. 3 shows an example intelligent honeypot 300, in accordance with some embodiments. The intelligent honeypot includes a conditioned deep learning processor 318 that has been trained for a predetermined time period, or based on another suitable criteria, as described in connection with FIG. 2. The intelligent honeypot is not connected to a factory's production P/E/C systems. In some embodiments, the deep learning processor can periodically receive updated data from a factory's production P/E/C systems. To ensure that no malware is introduced with the updated data—either from the factory's production P/E/C systems to the intelligent honeypot or from the intelligent honeypot to a factory's production P/E/C systems, the updates are not made directly to the intelligent honeypot directly from the factory's production P/E/C systems. Instead the data can be uploaded first to a memory device (e.g., a thumb drive), scrubbed of all malware, and then provided to deep learning processor 318.

Deep learning processor 318 encompasses a trained process simulator (as described in connection with FIG. 2), that can be configured to receive control signals from a process controller or emulator and to generate simulated response data that is similar to the response data that would be generated in production during operation and control of a factory's P/E/C system, in response to similar control signals.

The trained models of deep learning processor 318 and the process simulator can be in continuous two-way communication with each other. Also part of the intelligent honeypot, are one or more process controllers that can be programmed to generate control signal similar to the control signals that are generated by the process controller during the operation of a factory's P/E/C systems. The process controller can be the same type of PLC or other process controller that is used in a factory's production P/E/C system, or can be an emulated process controller (collectively, "controller emulator"). The process controller, actual or emulated, can be coupled to deep learning processor 318 (as represented by 310) to provide control signal to the process simulator and to receive control values from the process simulator. An emulator refers to hardware or software, that mimics the exact behavior of system it is emulating and strictly abides by parameters and rules of the emulated systems. The emulator will include all identification information from logs (bios) serial number, model number, manufacturing date or otherwise that pertains to the system that is being emulated.

Further, intelligent honeypot 300 is coupled to an interface that allows the intelligent honeypot (via the process controller or the controller emulators) to connect with network technologies e.g., local area network (LAN), a wide area network (WAN), the Internet, Bluetooth technologies, Nearfield communication technologies, Secure RF technologies, and/or any other suitable communication technologies, or data device (e.g., thumb drive, flash drive, USB drive) to receive inputs. The interface can expose the intelligent honeypot to a malware attack.

Figure 4:
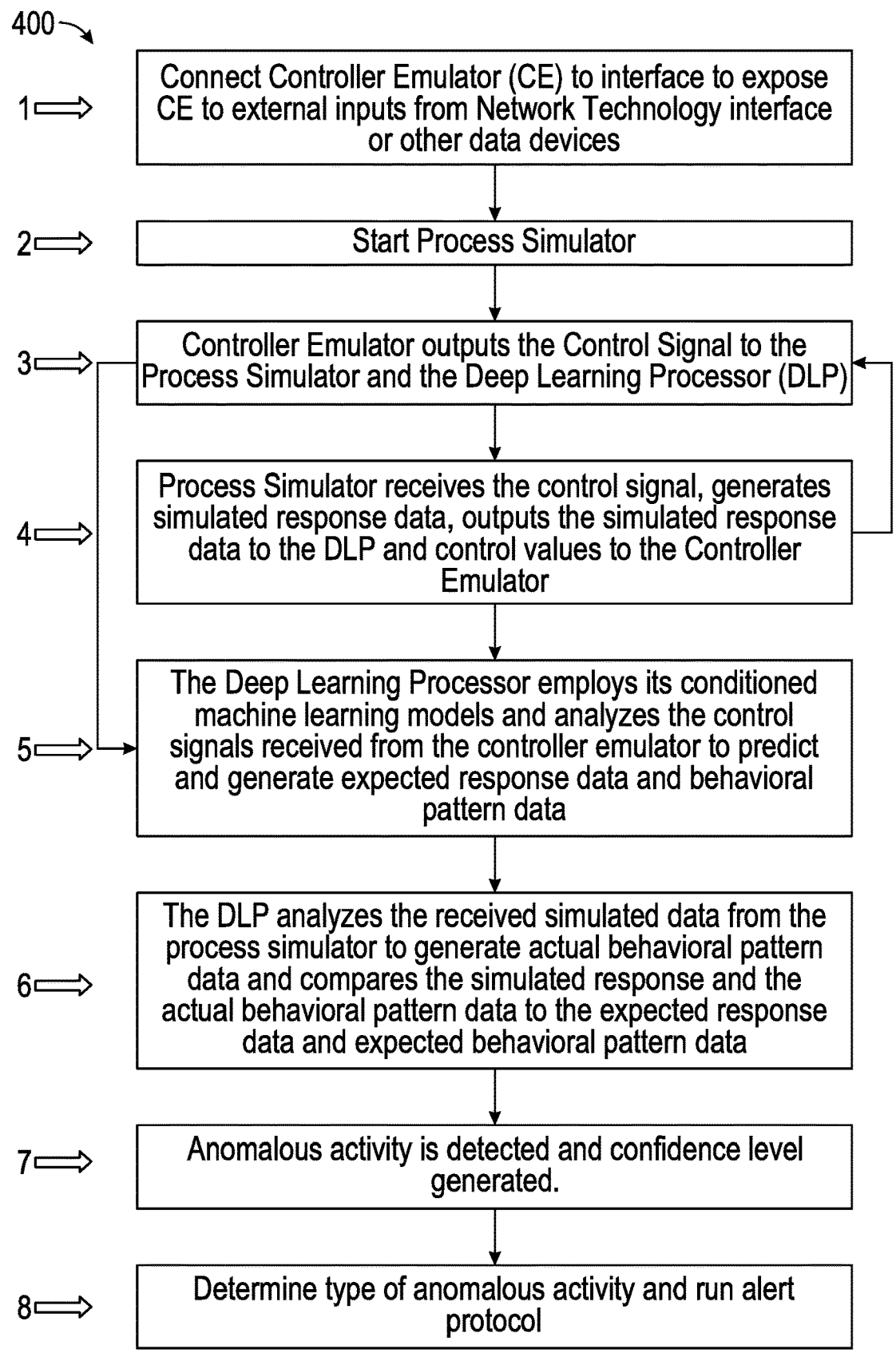
FIG. 4 shows an example method for running a simulated process to attract malware attacks, in accordance with various embodiments.

FIG. 4 shows an example method 400 for implementing an intelligent honeypot (as described in FIG. 3).

At step 1, the controller emulator can receive external inputs from an interface coupled to network technologies or other data devices. In some embodiments, a malware attack can be introduced to the intelligent honeypot via an external input.

At step 2, the simulated process is activated. The process simulator can run for a predetermined time or upon occurrence of a predefined event.

At step 3, the controller emulator outputs one or more control signals to the process simulator and the deep learning processor.

At step 4, the process simulator receives the one or more control signals and simulates response data, including control values. The process simulator outputs the control values to the controller emulator and outputs the simulated response data to the deep learning processor.

At step 5, the deep learning processor employs its conditioned machine learning models and analyzes the control signals received from the controller emulator to predict and generate expected response data and behavioral pattern data. Based on its understanding of factory operation and control data and such data's correlation to specific control signals, the deep learning processor can predict, for the received control signals, expected response data and corresponding behavioral patterns.

At step 6, the deep learning processor generates actual behavioral pattern data from the received simulated data and compares the simulated response data to the expected response data and/or compares the actual behavioral pattern data to the expected behavioral pattern data. Actual behavioral pattern data refers to behavioral pattern data that is generated for the received simulated response data, and is distinguished from expected behavioral pattern data, which is based on predicted response data.

By incorporating the conditioned machine learning models into deep learning processor 318, as discussed in connection with FIG. 2, including (1) capturing extensive and diverse data across the factory's P/E/C systems during production and (2) analyzing changes and normal process variations and noise data in the factory's P/E/C systems during a factory's operation, and how the components in the P/E/C systems respond to those changes and variations, deep learning processor 318 can learn to recognize any deviations in the simulated response data and actual behavioral pattern data, even miniscule deviations, from expected response data and behavioral patterns in a single component or across many components in a factory's P/E/C system. Deep learning processor 318 can identify anomalous activity and malware attacks, and generate a confidence level (step 7). In some aspects, the confidence level may be expressed as a numerical probability of accuracy for the prediction, in other aspects, the confidence level may be expressed as an interval or probability range.

An operator or algorithm can assign thresholds to the confidence levels associated with anomalous activities, and can also determine the type of anomalous activity based on the confidence level generated. Based on the type of anomalous activity, one or more operations (referred to herein as "alert protocols") are run to address the anomalous activity (step 8). For example, for anomalous activities receiving a high confidence level score, an alert protocol can be initiated by deep learning processor 318 and communicated to a controller emulator to run the initiated alert protocol, whereas with anomalous activities receiving lower confidence level scores, an operator can be prompted to review the anomalous activity before an alert protocol is initiated.

In one embodiment, the confidence levels can be divided into three intervals: high, medium and low, and a threshold can be assigned to each interval. Further, actions to be performed can be assigned to each interval. For example, for confidence levels that fall into the high confidence interval an alert protocol can be initiated, for confidence levels that fall into the medium confidence interval, an operator can be prompted to review the anomalous activity, for confidence levels that fall into the low confidence level interval, the anomalous activity can be flagged and sporadically checked. The thresholds and interval ranges can be reviewed and adjusted to minimize false positives or false negatives. In other embodiments, the confidence levels can be divided into two or more intervals.

In some embodiments, different alert protocols can be assigned to the different intervals. For example, if an anomalous activity has a confidence level that corresponds to a high interval, the alert protocol can trigger a strong action, like shutting down an associated factory's P/E/C systems that may be at risk or in some cases shutting down the intelligent honeypot. Whereas if the anomalous activity has a confidence level that corresponds to a lower interval, an alert protocol can trigger a more moderate action like generating a report, email or other notifications. In further embodiments, different alert protocols can be assigned to different types of anomalies detected that meet a predefined confidence level threshold. The alert protocol initiated can be a set of actions designed to compensate or correct for the type of anomalous activity detected.

The alert protocol can be mechanical (e.g., signaling an alert by siren, flashing light or other indicator), digital (e.g., printing a report, emailing a supervisor, notifying a control panel), functional (e.g., stopping any or all of the process similar or controller emulator, adjusting the settings of the process simulator or controller emulator), or any combination of the above. The alert protocol can be initiated by deep learning processor 318 and communicated to the controller emulator run the alert protocol. Functional protocols can be implemented by communication with a controller emulator (e.g., sending a control signals to process simulator). The protocol can be a digital activation of individual relays, controlled by TTL logic, ladder logic or other programmable commands communicated to external devices such as station controllers, PLCs or other. The protocol and command structure are incorporated into deep learning processor 318. Deep learning processor 318 can include programming to allow any of these. Input to the deep learning processor 318 can, in some embodiments, be performed, via manual input by keyboard entry. This helps maintain the integrity of deep learning processor 318. In further embodiments digital entry such as with a thumb drive or network connection can also be allowed.

Further, deep learning processor 318 can identify whether or not the anomalous activity is a malware attack, and a confidence level for its identification. For example, when behavioral pattern data indicates significant, sudden, rapid or unexpected changes in the response data that is different from the expected behavioral data. In one embodiment, deep learning processor 318 can analyze whether the behavioral pattern data is consistent with behavioral pattern data for known disruptive activity that is not a malware attack. In some embodiments deep learning processor 318 uses data output generated during the manufacturing process and/or data from a data logging module to determine whether the anomalous activity was caused by an attack or by some other failure (e.g., the material used was defective, a faulty component was installed)

An operator or algorithm can assign thresholds to the confidence levels associated with activities identified to be a malware attack and can predefine actions (referred to herein as "alert protocols") to be initiated when a threshold is met. For example, for detected malware attacks receiving a high confidence level score, an alert protocol can be initiated by deep learning processor 318 and communicated to the controller emulator to run the alert protocol, whereas with detected malware attacks receiving lower confidence level scores, an operator can be prompted to review the detected malware attack before an alert protocol is initiated. In one embodiment, the confidence levels can be divided into three intervals: high, medium and low, and a threshold can be assigned to each interval. In other embodiments, confidence levels can be divided into two or more intervals. Further, actions to be performed can be assigned to each interval. For example, for confidence levels that fall into the high confidence interval an alert protocol can be initiated, for confidence levels that fall into the medium confidence interval, an operator can be prompted to review the detected malware attack, for confidence levels that fall into the low confidence level interval, the detected malware attack can be flagged and sporadically checked. The thresholds and interval ranges can be reviewed and adjusted to minimize false positives or false negatives.

In some embodiments, different alert protocols can be assigned to the different intervals. For example, if the detected malware attack has a confidence level that corresponds to a high interval, the alert protocol can trigger a strong action, like shutting down an associated factory's P/E/C systems that may be at risk or in some cases the intelligent honeypot itself. Whereas if the detected malware attack has a confidence level that corresponds to a lower interval, an alert protocol can trigger a more moderate action like generating a report, email or other notifications that can identify the malware attack and suggest immediate corrective actions to counter the attack. In further embodiments, different alert protocols can be assigned to different types of types of malware attacks detected that meet a predefined confidence level threshold, and the proper alert protocol is initiated by deep learning processor 318 for the attack that is detected, when it exceeds a predefined confidence level. The alert protocol can be a set of actions designed to compensate or correct for the type of malware attack detected.

In some embodiments, when the confidence level exceeds a predefined limit indicating a malware attack, deep learning processor 1318 can automatically run a generative adversarial network or a second artificial intelligence model, collectively called a confirmation test, to confirm or deny the attack. If the confirmation test is confirmed the malware attack level can be raised to the highest alert. If the confirmation test is denied the confidence level of the original model can be assumed and reverts to the second highest alert level. As previously indicated separate alert protocols may be specified for each alert level.

In some embodiments, deep learning processor 318 can be configured to communicate with existing IT security systems to notify the systems of the anomalous activity. In further embodiments, deep learning processor 318 can be configured to communicate with a data logging module. This communication can provide alerts specifying the exact source of the malware attack and also be used to reconfigure firewall and other IT infrastructure to better defend the factory processes and equipment. In some embodiments deep learning processor 318 can be configured to communicate with a computer system in a factory's production P/E/C systems to perform an alert protocol, to correct a vulnerability or anomaly. to deflect or counteract an identified malware attack and/or to shut down one or more of a factory's production P/E/C systems.

The machine learning models of deep learning processor 318 can continue to be conditioned through the operation of intelligent honeypot 300.

Figure 5:
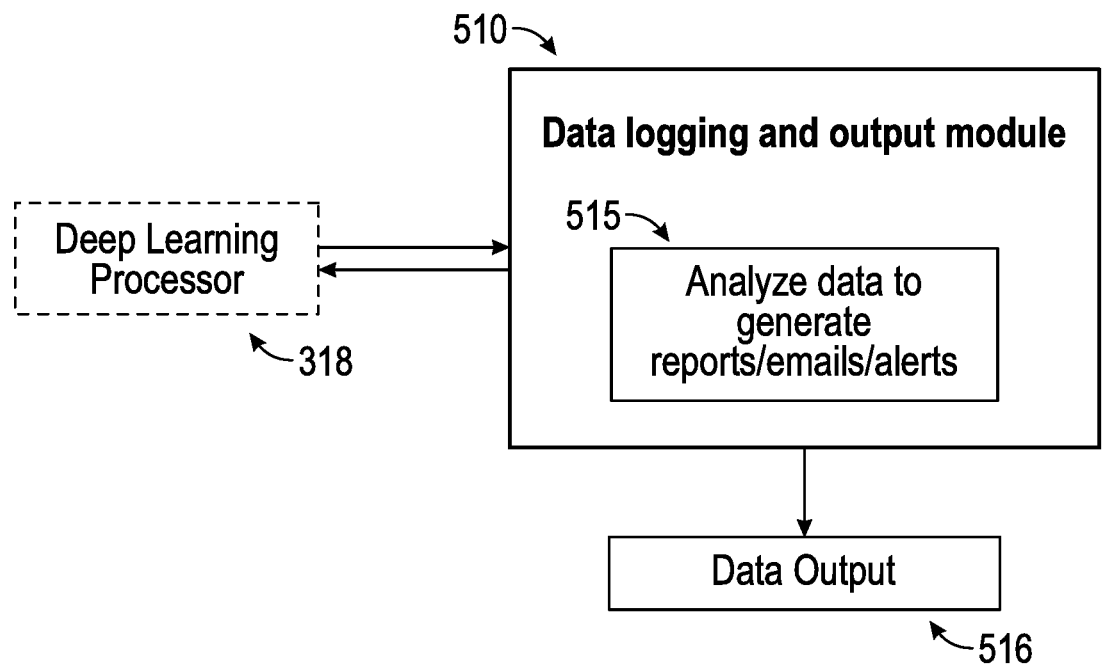
FIG. 5 shows an example method for logging data.

FIG. 5 shows an example data logging and output module 510 that can be configured to receive data from deep learning processor 318, and data processing server 800 to analyze the data and to generate reports, emails, alerts, log files or other data compilations (step 515). For example, data logging module 510 can be programmed to search the received data for predefined triggering events, and to generate reports, emails, alerts, log files, updates to a monitoring dashboard, or other data compilations showing relevant data associated with those triggering events (step 515). For example, identification of anomalous activity can be defined as a triggering event and the following data can be reported: behavioral pattern for the response data compared to the expected behavioral pattern, the station(s), controller(s) or sensor(s) that were impacted by the anomalous activity, the sensor(s) that generated the triggering event, identification of the specific response data that is unexpected, date and time of day that the anomalous activity occurred, the confidence level associated with the triggering event, the impact of the anomalous activity on other stations and the intermediate or final output. Other suitable triggers can be defined, and other suitable data can be reported. In some embodiments, data logging module 510 can be included within deep learning processor 118. In some embodiments, data from the data logging module can be provided to deep learning processor 118 as part of the response data, as discussed in connection with FIGS. 2 and 4 or to initiate an alert protocol.

Figure 6:
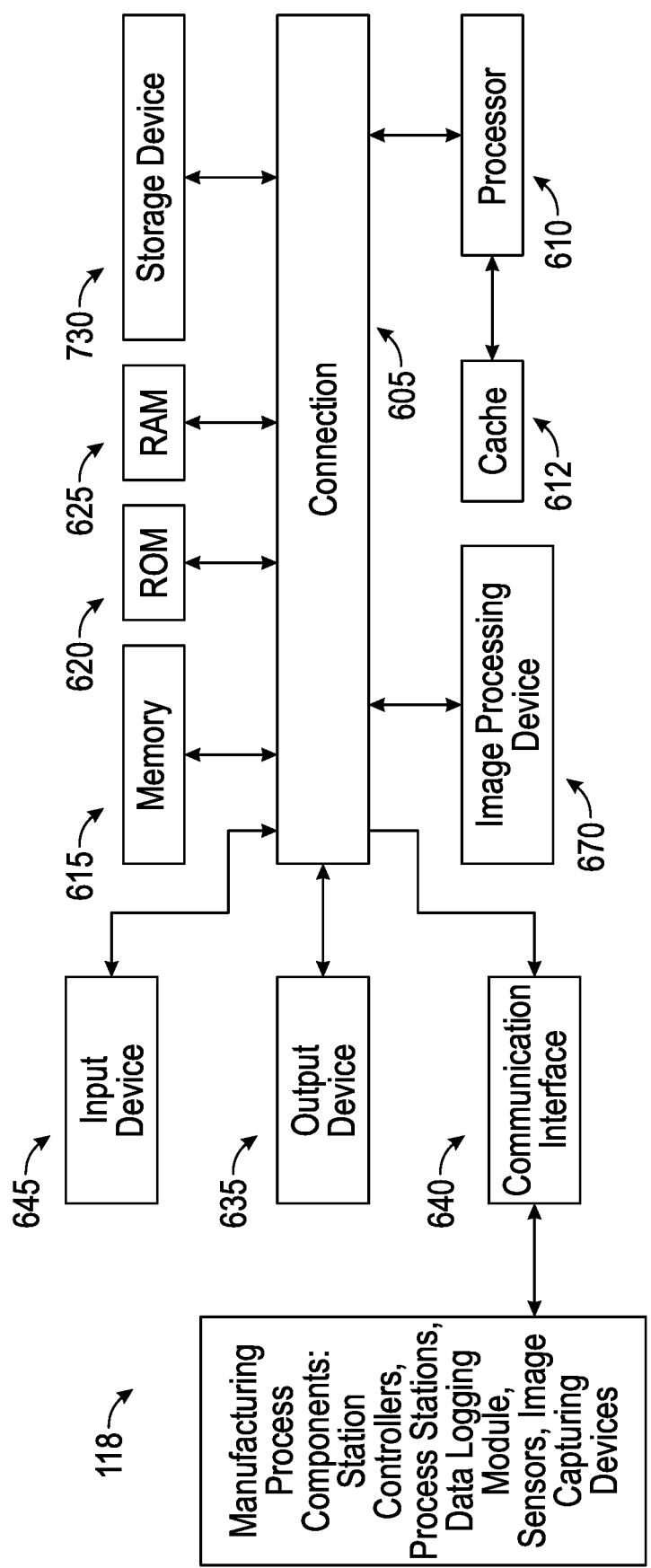
FIG. 6 shows an illustrative example of a computing system architecture including various components in electrical communication with each other using a connection in accordance with various embodiments.

Deep learning processor 118, as shown in FIG. 6, can include a processing unit (e.g., CPU/s and/or processor/s) 610 and bus 605 that couples various system components including system memory 615, such as read only memory (ROM) 620 and random access memory (RAM) 625, to processing unit 610. Processing unit 610 can include one or more processors such as a processor from the Motorola family of microprocessors or the MIPS family of microprocessors. In an alternative embodiment, the processing unit 610 can be specially designed hardware for controlling the operations of deep learning processor 118 and performing predictive process control. When acting under the control of appropriate software or firmware, processing module 610 can perform various machine learning algorithms and computations described herein.

Memory 615 can include various memory types with different performance. characteristics, such as memory cache 612. Processor 610 can be coupled to storage device 630, which can be configured to store software and instructions necessary for implementing one or more functional modules and/or database systems. Each of these modules and/or database systems can be configured to control processor 610 as well as a special-purpose processor where software instructions are incorporated into the actual processor design.

To enable operator interaction with deep the learning processor, input device 645 can represent any number of input mechanisms, such as a microphone for speech, a touch-sensitive screen for gesture or graphical input, keyboard, mouse, motion input and so forth. An output device 635 can also be one or more of a number of output mechanisms (e.g., printer, monitor) known to those of skill in the art. In some instances, multimodal systems can enable an operator to provide multiple types of input to communicate with the deep learning processor. Communications interface 640 can generally govern and manage the operator input and system output, as well as all electronic input received from and sent to other components that are part of a manufacturing process such as the station controllers, process stations, data logging module, and all associated sensors and image capturing devices. There is no restriction on operating on any particular hardware arrangement and therefore the basic features here may easily be substituted for improved hardware or firmware arrangements as they are developed. Data output from deep learning processor can be displayed visually, printed, or generated in file form and stored in storage device 630 or transmitted to other components for further processing.

Communication interface 640 can be provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow processing unit 610 to efficiently perform machine learning and other computations necessary to implement predictive process control. Communication interface 640 can be configured to communicate with the other components that are part of a manufacturing process such as the station controllers, process stations, data logging module, and all associated sensors and image capturing devices.

In some embodiments, the deep learning processor can include an imaging processing device 670 that processes images received by various image capturing devices such as video cameras, that are coupled one or more processing station and are capable of monitoring and capturing images of intermediate and final outputs. These images can be transmitted to the deep learning processor via communication interface 640, and processed by image processing device 670. The images can be processed to provide data, such as number and type of defects, output dimensions, throughput, that can be used by the deep learning processor to compute intermediate and final output values. In some embodiments, the image processing device can be external to deep learning processor and provide information to deep learning processor via communication interface 640.

Storage device 630 is a non-transitory memory and can be a hard disk or other types of computer readable media that can store data accessible by a computer, such as magnetic cassettes, flash memory cards, solid state memory devices, digital versatile disks, cartridges, random access memories (RAMs) 625, read only memory (ROM) 620, and hybrids thereof.

In practice, storage device 630 can be configured to receive, store and update input data to and output data from the deep learning processor, for example functional priors, experiential priors, universal input; pre-process inputs; in-process inputs and post-process inputs.

In some embodiments, deep learning processor 318 can include the same components shown in FIG. 6 for deep learning processor 118, except the communication interface is coupled to an interface that allows the intelligent honeypot (via the process controller or the controller emulators) to connect with network technologies e.g., local area network (LAN), a wide area network (WAN), the Internet, Bluetooth technologies, Nearfield communication technologies, Secure RF technologies, and/or any other suitable communication technologies, or data device (e.g., thumb drive, flash drive, USB drive) to receive inputs. The interface can expose the intelligent honeypot to a malware attack. Further, the communications interface is not coupled to any in production manufacturing process components.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. The apparatus, method and system for intelligently emulating factory control systems and simulating response data have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A computer-implemented method, comprising:
providing, by a controller emulator coupled to an interface, one or more control signals to a process simulator and a deep learning processor, wherein the interface exposes the controller emulator to inputs from an external source;
in response to receiving the one or more control signals, simulating, by the process simulator, response data that is provided to the deep learning processor;
generating, by the deep learning processor, expected response data and expected behavioral pattern data for the one or more control signals;
generating, by the deep learning processor, actual behavioral pattern data for the simulated response data;
comparing at least one of: (i) the simulated response data to the expected response data, and (ii) the actual behavioral pattern data to the expected behavioral pattern data to determine whether anomalous activity is detected; and
as a result of detecting the anomalous activity, performing one or more operations to address the anomalous activity.

2. The computer-implemented method of claim 1, wherein the deep learning processor includes a conditioned machine learning model.

3. The computer-implemented method of claim 1, wherein the simulated response data includes a control value that is provided to the controller emulator.

4. The computer-implemented method of claim 1, wherein the one or more operations include shutting down one or more factory process, equipment, and control (P/E/C) systems at risk as a result of the anomalous activity.

5. The computer-implemented method of claim 1, wherein the one or more operations include generating a notification, wherein the notification specifies the anomalous activity, and wherein the notification is provided to an operator to review the anomalous activity.

6. The computer-implemented method of claim 1, wherein the anomalous activity is detected as a result of a comparison of the simulated response data to the expected response data indicating a deviation.

7. The computer-implemented method of claim 1, wherein the anomalous activity is detected as a result of a comparison of the actual behavioral pattern data to the expected behavioral pattern data indicating a deviation.

8. The computer-implemented method of claim 1, wherein the one or more operations include determining whether the anomalous activity is a malware attack received by the controller emulator from the interface, wherein a determination that the anomalous activity is the malware attack is generated as a result of a confidence level score of the anomalous activity satisfying a confidence level threshold corresponding to detection of the malware attack.

9. A system, comprising:
one or more processors; and
memory storing thereon instructions that, as a result of being executed by the one or more processors, cause the system to:
receive, from a controller emulator coupled to an interface, one or more control signals, wherein the interface exposes the controller emulator to inputs from an external source;
in response to receiving the one or more control signals, simulate response data including control values;
generate expected response data and expected behavioral pattern data for the one or more control signals;
generate actual behavioral pattern data, wherein the actual behavioral pattern data is generated using the simulated response data;
compare at least one of: (i) the simulated response data to the expected response data and (ii) the actual behavioral pattern data to the expected behavioral pattern data to determine whether anomalous activity is detected; and
as a result of detecting the anomalous activity, perform one or more operations to address the anomalous activity.

10. The system of claim 9, wherein the one or more processors include a conditioned machine learning model.

11. The system of claim 9, wherein the one or more operations include communicating an alert protocol to cause the controller emulator to shut down one or more factory process, equipment, and control (P/E/C) systems at risk as a result of the anomalous activity.

12. The system of claim 9, wherein the instructions that cause the one or more processors to perform the one or more operations to address the anomalous activity further cause the system to:
determine, based on the anomalous activity detected, a confidence level associated with the anomalous activity; and
identify, based on the confidence level, the one or more operations.

13. The system of claim 12, wherein the one or more operations include determining whether the anomalous activity is a malware attack received by the controller emulator from the interface, wherein a determination that the anomalous activity is the malware attack is generated as a result of the confidence level satisfying a confidence level threshold corresponding to detection of the malware attack.

14. The system of claim 9, wherein the one or more operations include generating a notification, wherein the notification specifies the anomalous activity, and wherein the notification is provided to an operator to review the anomalous activity.

15. The system of claim 9, wherein the anomalous activity is detected detected as a result of a comparison of the simulated response data indicating to the expected response data indicating a deviation.

16. The system of claim 9, wherein the anomalous activity is detected as a result of a comparison of the actual behavioral pattern data to the expected behavioral pattern data indicating a deviation.

17. A non-transitory, computer-readable storage medium storing thereon executable instructions that, as a result of being executed by a computer system, cause the computer system to:
- receive, from a controller emulator coupled to an interface one or more control signals, wherein the interface exposes the controller emulator to inputs from an external source;
- in response to receiving the one or more control signals, simulate response data including control values;
- generate expected response data and expected behavioral pattern data for the one or more control signals;
- generate actual behavioral pattern data, wherein the actual behavioral pattern data is generated using the simulated response data;
- compare at least one of: (i) the simulated response data to the expected response data and (ii) the actual behavioral pattern data to the expected behavioral pattern data to determine whether anomalous activity is detected; and
- as a result of detecting the anomalous activity, perform one or more operations to address the anomalous activity.

18. The non-transitory, computer-readable storage medium of claim 17, wherein the one or more operations include:
- identifying a type of the anomalous activity detected; and
- executing a set of actions to compensate for the type of the anomalous activity detected.

19. The non-transitory, computer-readable storage medium of claim 17, wherein the one or more operations include:
- determining whether the anomalous activity is a malware attack received by the controller emulator from the interface; and
- as a result of a determination that the anomalous activity is the malware attack, communicating an alert protocol to cause the controller emulator to shut down one or more factory process, equipment, and control (P/E/C) systems at risk as a result of the malware attack.

20. The non-transitory, computer-readable storage medium of claim 17, wherein the one or more operations include generating a notification, wherein the notification specifies the anomalous activity, and wherein the notification is provided to an operator to review the anomalous activity.

* * * * *